(12) United States Patent
Wieringa

(10) Patent No.: US 6,920,650 B2
(45) Date of Patent: *Jul. 26, 2005

(54) PORTABLE OUTDOOR TOILET WITH ADVERTISING INDICIA

(75) Inventor: Lawrence D. Wieringa, Riverside, CA (US)

(73) Assignee: Max Resultz, Riverside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/476,352

(22) PCT Filed: Jan. 30, 2002

(86) PCT No.: PCT/US02/02913

§ 371 (c)(1), (2), (4) Date: Oct. 27, 2003

(87) PCT Pub. No.: WO02/087404

PCT Pub. Date: Nov. 7, 2002

(65) Prior Publication Data

US 2004/0139539 A1 Jul. 22, 2004

Related U.S. Application Data

(63) Continuation of application No. 09/844,610, filed on Apr. 27, 2001, now Pat. No. 6,349,426.

(51) Int. Cl.[7] ............................................. A47K 11/02
(52) U.S. Cl. ......................................................... 4/449
(58) Field of Search ............................ 4/449, 462–463, 4/476–479, 483; 40/594, 611, 306; 52/27, 38

(56) References Cited

U.S. PATENT DOCUMENTS

| | | | | |
|---|---|---|---|---|
| 3,066,311 A | * | 12/1962 | Tharp | 4/462 |
| 3,447,167 A | * | 6/1969 | Harding | 4/462 |
| 3,803,738 A | | 4/1974 | Weiss | 40/306 |
| 3,835,480 A | * | 9/1974 | Harding | 4/459 |
| 4,031,572 A | * | 6/1977 | Harding | 52/79.1 |
| 4,831,671 A | | 5/1989 | Harding | 4/460 |
| 5,448,844 A | | 9/1995 | Miller, Jr. et al. | 40/611 |
| 6,047,488 A | * | 4/2000 | Tuszkiewicz | 40/306 |

* cited by examiner

Primary Examiner—Charles E. Phillips
(74) Attorney, Agent, or Firm—Ladas & Parry LLP

(57) ABSTRACT

A portable outdoor toilet (10) with advertising indicia including a platform (12) having a generally circular configuration. A base (18) is positioned atop the platform (12). The base (18) has a generally circular configuration. A cylindrical tube (26) is positioned atop the base (18). The cylindrical tube (26) has an open upper end (28), an open lower end (30), and a cylindrical side wall (32) therebetween. The open lower end (28) is positioned on the platform (12). The cylindrical side wall (32) has an opening (34) therein. The opening (34) has a door (36) hingedly coupled thereto. A roof (38) is positioned atop the open upper end (28) of the cylindrical tube (26). The roof (38) has a generally circular and arcuate configuration. A flexible sheet (46) is adapted for being wrappedly disposed around the cylindrical tube (26).

8 Claims, 3 Drawing Sheets

PORTABLE OUTDOOR TOILET WITH ADVERTISING INDICIA

This application is a 371 of PCT/US02/02813 filed Jan. 10, 2002 which is a continuation of U.S. application Ser. No. 09/844,610 filed Apr. 27, 2001, now U.S. Pat. No. 6,349,426.

TECHNICAL FIELD

The present invention relates to a portable outdoor toilet with advertising indicia and more particularly pertains to providing a place for one to relieve oneself in a seemingly pleasant environment.

BACKGROUND ART

The use of display devices is known in the prior art. More specifically, display devices heretofore devised and utilized for the purpose of advertising commercial products are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,803,738 to Weiss discloses an attachable advertising sign for an outdoor receptacle. U.S. Pat. No. 5,488,844 to Miller, Jr. discloses an attachable display panel for a round receptacle. U.S. Pat. No. 4,831,671 to Harding discloses a construction for a portable toilet.

While these devices fulfill their respective, particular objective and requirements, the aforementioned patents do not describe a portable outdoor toilet with advertising indicia for providing a place for one to relieve oneself in a seemingly pleasant environment.

In this respect, the portable outdoor toilet with advertising indicia according to the present invention substantially departs from the conventional concepts and designs of the prior art, and in doing so provides an apparatus primarily developed for the purpose of providing a place for one to relieve oneself in a seemingly pleasant environment.

Therefore, it can be appreciated that there exists a continuing need for a new and improved portable outdoor toilet with advertising indicia which can be used for providing a place for one to relieve themselves in a seemingly pleasant environment. In this regard, the present invention substantially fulfills this need.

DISCLOSURE OF INVENTION

In the view of the foregoing disadvantages inherent in the known types of display devices now present in the prior art, the present invention provides an improved portable outdoor toilet with advertising indicia. As such, the general purpose of the present invention, which will be described subsequently in greater detail, is to provide a new and improved portable outdoor toilet with advertising indicia which has all the advantages of the prior art and none of the disadvantages.

To attain this, the present invention essentially comprises a platform having a generally circular configuration. The platform has a pair of centrally disposed apertures' therethrough. The platform has a plurality of supports secured to a lower surface thereof. A base is positioned atop the platform. The base has a generally circular configuration. The base has a pair of centrally disposed apertures' therethrough in alignment with the apertures of the platform. Fastening hardware extends between the apertures of the base and platform to facilitate securement. The base has a peripheral ring extending upwardly therefrom. The base has an inner ring extending upwardly therefrom interiorly of the peripheral ring. The inner ring has an upper end disposed above an upper end of the peripheral ring. A cylindrical tube is positioned atop the base. The cylindrical tube has an open upper end, an open lower end, and a cylindrical side wall therebetween. The open lower end is positioned on the platform between the peripheral ring and the inner ring. The cylindrical side wall has an opening therein. The opening has a door hingedly coupled thereto. A roof is positioned atop the open upper end of the cylindrical tube. The roof has a generally circular and arcuate configuration. The roof has at least one ventilation hole therethrough. The roof has a peripheral ring extending downwardly therefrom. The roof has an inner ring extending downwardly therefrom interiorly of the peripheral ring. The inner ring has a lower end disposed below a lower end of the peripheral ring. The roof is positioned atop the cylindrical tube with the open upper end received between the peripheral ring and the inner ring. A flexible sheet is adapted for being wrappedly disposed around the cylindrical side wall of the cylindrical tube. The sheet has an inner surface and an outer surface. The inner surface has an adhesive disposed thereon. The outer surface has indicia disposed thereon. The sheet has a lateral slit formed therein to accommodate the door of the cylindrical side wall.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable outdoor toilet with advertising indicia which has all the advantages of the prior art display devices and none of the disadvantages.

It is another object of the present invention to provide a new and improved portable outdoor toilet with advertising indicia which may be easily and efficiently manufactured and marketed.

It is a further object of the present invention to provide a new and improved portable outdoor toilet with advertising indicia which is of durable and reliable construction.

An even further object of the present invention is to provide a new and improved portable outdoor toilet with advertising indicia which is susceptible of a low cost of manufacture with regard to both materials and labor, and which accordingly is then susceptible of low prices of sale to the consuming public, thereby making such a portable outdoor toilet with advertising indicia economically available to the buying public.

Even still another object of the present invention is to provide a new and improved portable outdoor toilet with advertising indicia for providing a place for one to relieve oneself in a seemingly pleasant environment.

Lastly, it is an object of the present invention to provide a new and improved portable outdoor toilet with advertising indicia including a platform having a generally circular configuration. A base is positioned atop the platform. The base has a generally circular configuration. A cylindrical tube is positioned atop the base. The cylindrical tube has an open upper end, an open lower end, and a cylindrical side wall therebetween. The open lower end is positioned on the platform. The cylindrical side wall has an opening therein. The opening has a door hingedly coupled thereto. A roof is positioned atop the open upper end of the cylindrical tube. The roof has a generally circular and arcuate configuration. A flexible sheet is adapted for being wrappedly disposed around the cylindrical side wall of the cylindrical tube. The sheet has an inner surface and an outer surface. The inner surface has an adhesive disposed thereon. The outer surface has indicia disposed thereon. The sheet has a lateral slit formed therein to accommodate the door of the cylindrical side wall.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

BEST MODE FOR CARRYING OUT THE INVENTION

Figure 1:
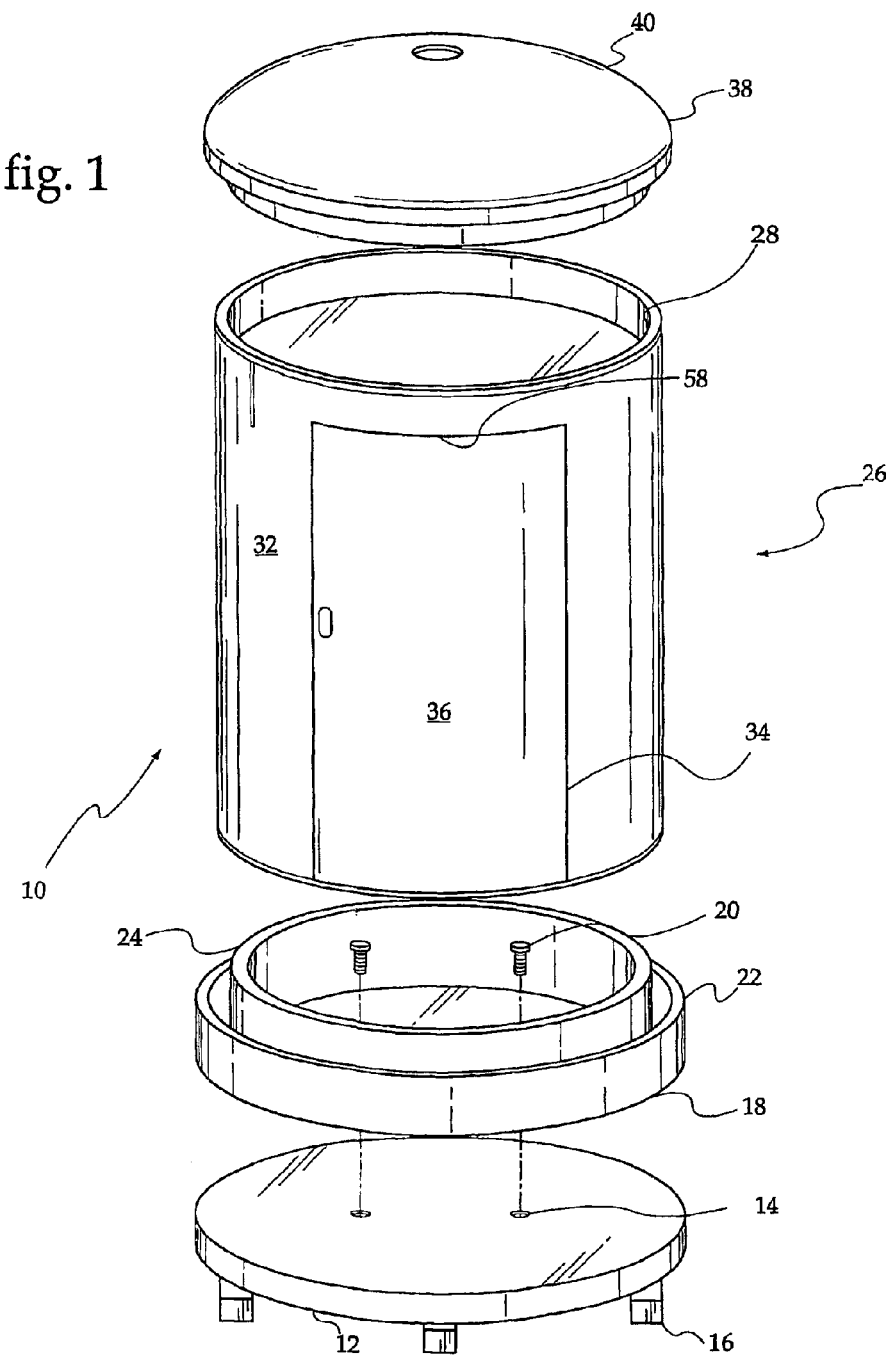
FIG. 1 is a perspective view of the preferred embodiment of the portable outdoor toilet with advertising indicia constructed in accordance with the principles of the present invention.
Figure 2:
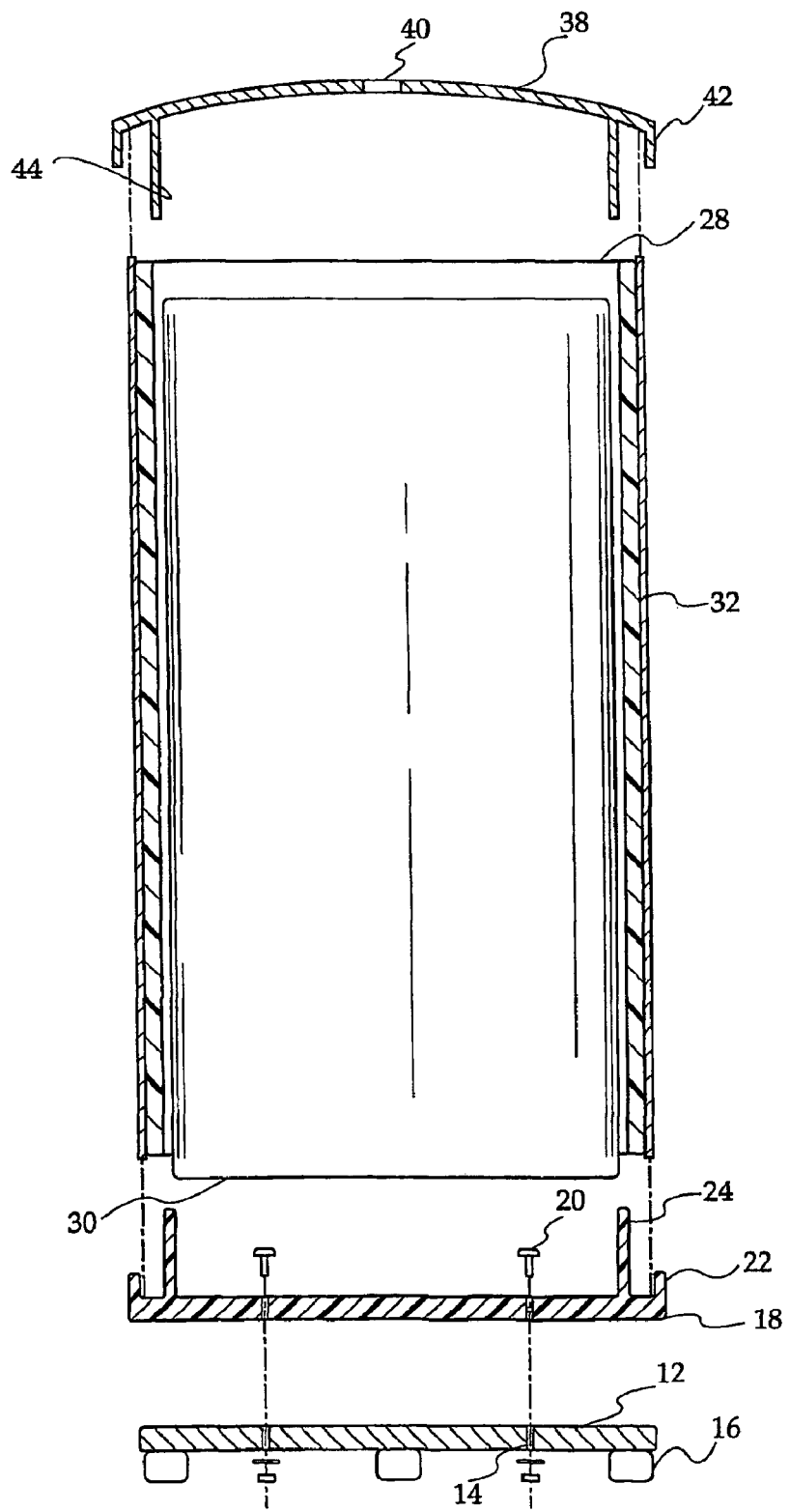
FIG. 2 is a cross-sectional exploded front view of the present invention.
Figure 3:
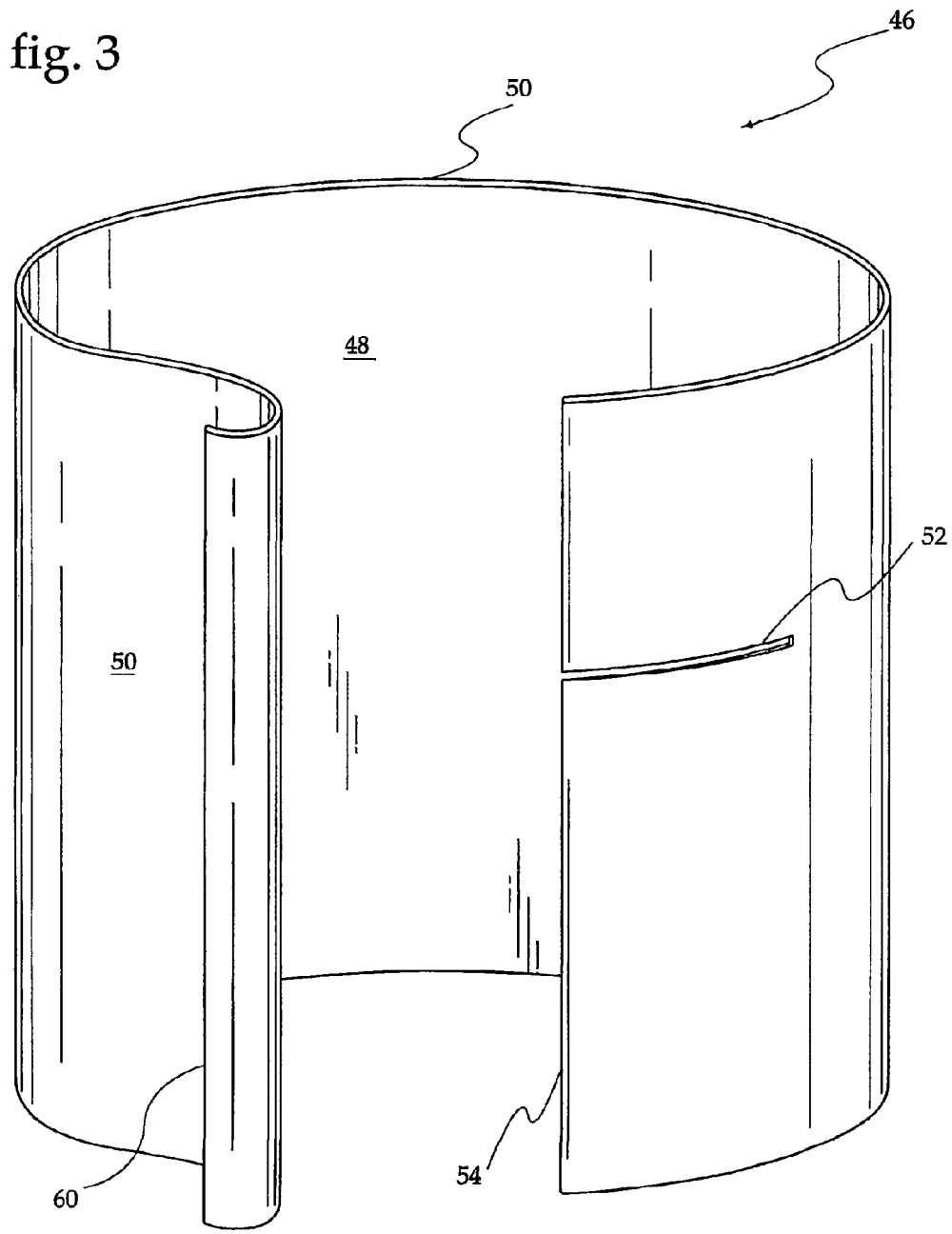
FIG. 3 is a front view of the removable sign of the present invention.

With reference now to the drawings, and in particular, to FIGS. 1 through three thereof, the preferred embodiment of the new and improved portable outdoor toilet with advertising indicia embodying the principles and concepts of the present invention and generally designated by the reference number 10 will be described.

Specifically, it will be noted in the various Figures that the device relates to a portable outdoor toilet with advertising indicia for providing a place for one to relieve oneself in a seemingly pleasant environment. In its broadest context, the device consists of a platform, a base, a cylindrical tube, a roof, and a flexible sheet. Such components are individually configured and correlated with respect to each other so as to attain the desired objective.

The platform 12 has a generally circular configuration. The platform 12 has a pair of centrally disposed apertures 14 therethrough. The platform 12 has a plurality of supports 16 secured to a lower surface thereof. The plurality of supports 16 serve to elevate the platform 12 above a recipient surface. Since the device 10 will be most likely positioned outdoors, the supports 12 will prevent the platform 12 from being damaged due to ground contact.

The base 18 is positioned atop the platform 12. The base 18 has a generally circular configuration. The base 18 has a pair of centrally disposed apertures 20 therethrough in alignment with the apertures 14 of the platform 12. Fastening hardware 20 extends between the apertures 14,20 of the base 18 and platform 12 to facilitate securement. The base 18 has a peripheral ring 22 extending upwardly therefrom. The base 18 has an inner ring 24 extending upwardly therefrom interiorly of the peripheral ring 22. The inner ring 24 has an upper end disposed above an upper end of the peripheral ring 22.

The cylindrical tube 26 is positioned atop the base 18. The cylindrical tube 26 has an open upper end 28, an open lower end 30, and a cylindrical side wall 32 therebetween. The open lower end 30 is positioned on the base 18 between the peripheral ring 22 and the inner ring 24. The cylindrical side wall 32 has an opening 34 therein. The opening 34 has a door 36 hingedly coupled thereto.

The roof 38 is positioned atop the open upper end 28 of the cylindrical tube 26. The roof 38 has a generally circular and arcuate configuration. The roof 38 has at least one ventilation hole 40 therethrough. The roof 38 has a peripheral ring 42 extending downwardly therefrom. The roof 38 has an inner ring 44 extending downwardly therefrom interiorly of the peripheral ring 42. The inner ring 44 has a lower end disposed below a lower end of the peripheral ring 42. The roof 38 is positioned atop the cylindrical tube 26 with the open upper end 28 received between the peripheral ring 42 and the inner ring 44.

The flexible sheet 46 is adapted for being wrappedly disposed around the cylindrical side wall 32 of the cylindrical tube 26. The sheet 46 has an inner surface 48 and an outer surface 50. The inner surface 48 has an adhesive disposed thereon. The outer surface 50 has indicia disposed thereon. The sheet 46 has a lateral slit 52 formed therein to accommodate the door 36 of the cylindrical side wall 32. The indicia on the flexible sheet 46 can be in the form of advertising or a scenic design. The indicia will be specifically suited to the environment that the present invention will be located. The positioning of the flexible sheet 46 on the cylindrical side wall 32 is critical. A first longitudinal edge 54 of the sheet must be positioned adjacently to a left side edge 56 of the door 36. The lateral slit 52 should then correspond with an upper edge 58 of the door 36. Once the sheet 46 has been wrapped entirely around the tube 26, a second longitudinal edge 60 of the sheet 46 will be disposed outside of the left side edge 56 of the door 36. Thus, the door 36 can be opened without risk of damage to the sheet 46 while the sheet 46 will completely cover the tube 26 at all times except when the door 36 is open.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. A portable outdoor toilet with advertising indicia for providing a place for one to relieve oneself in a seemingly pleasant environment, said portable outdoor toilet including:
   a base having an upwardly extending peripheral ring and an upwardly extending inner ring disposed interiorly of the peripheral ring, the inner ring having an upper end disposed above an upper end of the peripheral ring;
   a cylindrical tube positioned atop the base, the cylindrical tube having an open upper end, an open lower end, and a cylindrical side wall therebetween, the open lower end being positioned on the platform between the peripheral ring and the inner ring, the cylindrical side wall having an opening therein, the opening having a door hingedly coupled thereto;
   the cylindrical side wall having an outer surface adapted for receiving said advertising indicia; and
   a roof positioned atop the open upper end of the cylindrical tube, the roof having a generally circular and arcuate configuration, the roof having at least one ventilation hole therethrough, the roof having a downwardly extending ring and a downwardly extending inner ring disposed interiorly of the peripheral ring, the inner ring having a lower end disposed below a lower end of the peripheral ring, the roof being positioned atop the cylindrical tube with the open upper end received between the peripheral ring and the inner ring.

2. The portable outdoor toilet of claim one wherein the advertising indicia comprises a flexible sheet adapted for being wrappedly disposed around the outer surface of the cylindrical side wall of the cylindrical tube, the sheet having an inner surface and an outer surface, the inner surface having an adhesive disposed thereon, the outer surface having indicia disposed thereon, the sheet having a lateral slit formed therein to accommodate the door of the cylindrical side wall.

3. A portable outdoor toilet with advertising indicia for providing a place for one to relieve oneself in a seemingly pleasant environment comprising, in combination:
   a platform;
   a base positioned atop the platform;
   a cylindrical tube positioned atop the base, the cylindrical tube having an open upper end, an open lower end, and a cylindrical side wall therebetween, the cylindrical side wall having an opening therein, the opening having a door hingedly coupled thereto;
   a roof positioned atop the open upper end of the cylindrical tube, the roof having a generally circular and arcuate configuration upper end received between the peripheral ring and the inner ring; and
   a flexible sheet adapted for being wrapped disposed around the cylindrical side wall of the cylindrical tube, the sheet having an inner surface and an outer surface, the inner surface having an adhesive disposed thereon, the outer surface having indicia disposed thereon, the sheet having a lateral slit formed therein to accommodate the door of the cylindrical side wall.

4. The portable outdoor toilet with advertising indicia as set fourth in claim three, wherein the base has a pair of centrally disposed apertures therethrough in alignment with a pair of centrally disposed apertures in the platform, fastening hardware extending between the apertures of the base and platform to facilitate securement.

5. The portable outdoor toilet with advertising indicia as set forth in the claim three, wherein the base has a peripheral ring extending upwardly therefrom, the base having an inner ring extending upwardly therefrom interiorly of the peripheral, the inner ring having an upper end disposed above an upper end of the peripheral ring, the open lower end of the cylindrical tube being positioned between the peripheral ring and the inner ring.

6. The portable toilet with advertising indicia as set forth in claim three, wherein the room has at least one ventilation hole therethrough.

7. The portable outdoor toilet with advertising indicia as set forth in claim three, wherein the roof has a peripheral ring extending downwardly therefrom, the roof having an inner rind extending downwardly therefrom interiorly of the peripheral ring, the roof being positioned atop the lower end disposed below a lower end of the peripheral ring, the roof being positioned atop the cylindrical tube with the open upper end received between the peripheral ring and the inner ring.

8. The portable outdoor toilet with advertising indicia as set forth in claim three, wherein the platform has a plurality of supports secured to a lower surface thereof.

* * * * *